United States Patent [19]
Wada et al.

[11] Patent Number: 5,617,484
[45] Date of Patent: Apr. 1, 1997

[54] IMAGE BINARIZING APPARATUS

[75] Inventors: Toshiaki Wada; Kangda Wang, both of Tokyo, Japan

[73] Assignee: Olympus Optical Co., Ltd., Tokyo, Japan

[21] Appl. No.: 466,362

[22] Filed: Jun. 6, 1995

Related U.S. Application Data

[63] Continuation of Ser. No. 125,602, Sep. 23, 1993, abandoned.

[30] Foreign Application Priority Data

Sep. 25, 1992 [JP] Japan ................................ 4-256116
Apr. 21, 1993 [JP] Japan ................................ 5-094554

[51] Int. Cl.$^6$ .................................................. G06K 9/00
[52] U.S. Cl. .................. 382/172; 382/156; 382/272; 382/273
[58] Field of Search ............................. 382/156, 159, 382/161, 270, 271, 272, 273, 168, 172, 21, 23

[56] References Cited

U.S. PATENT DOCUMENTS

| | | | |
|---|---|---|---|
| 4,741,046 | 4/1988 | Matsunawa et al. | 382/51 |
| 5,046,118 | 9/1991 | Ajewole et al. | 382/51 |
| 5,138,671 | 8/1992 | Yokoyama | 382/51 |
| 5,179,599 | 1/1993 | Formanek | 382/51 |
| 5,201,014 | 4/1993 | Degi et al. | 382/51 |
| 5,296,940 | 2/1994 | Kawashima | 382/51 |
| 5,309,525 | 5/1994 | Shimomura et al. | 382/14 |

FOREIGN PATENT DOCUMENTS 5-328133  12/1993  Japan.
4-131051  12/1993  Japan.

OTHER PUBLICATIONS

N. Otsu, "An Automatic Threshold Selection Method Based on Discriminant and Least Squares Criteria"; Apr. 1980; pp. 349–356; Electrotechnical Laboratory; vol. J63-D No. 4; Ibaraki-ken, Japan.

N. Babaguchi et al; "Connectionist Model Binarization"; 1991; pp. 127–142; International Journal of Pattern Recognition & Artificial Intelligence, vol. 5, No. 4.

D. Rumelhart et al; "Learning Internal Representations by Error Propagation"; 1988; pp. 319–328; Parallel Distributed Processing; vol. 1; The MIT Press; Cambridge, Mass.

*Primary Examiner*—Joseph Mancuso
*Attorney, Agent, or Firm*—Frishauf, Holtz, Goodman, Langer & Chick

[57] ABSTRACT

An image binarizing apparatus, which comprises an image sensor for inputting a character image or a line image, an A/D converter for digitizing the output of the image sensor, a frame memory for temporary storage of the digital image, a window circuit for generating address information for dividing the stored image into a predetermined number of partial images, a brightness extractor for obtaining the highest brightness, lowest brightness and average brightness for the pixels for each block, a neural network which provides the optimum threshold value based on pre-learned data when receiving the highest brightness, lowest brightness and average brightness, a binarizer for binarizing each pixel of a partial image block from the frame memory based on the optimum threshold value ("white pixel" when the value of the brightness of the pixel is larger than the output value of the neural network, and "black pixel" when the value of the brightness of the pixel is smaller than the output value of the neural network), and another frame memory for storing the binarized image at a predetermined address.

10 Claims, 14 Drawing Sheets

FIG. 5
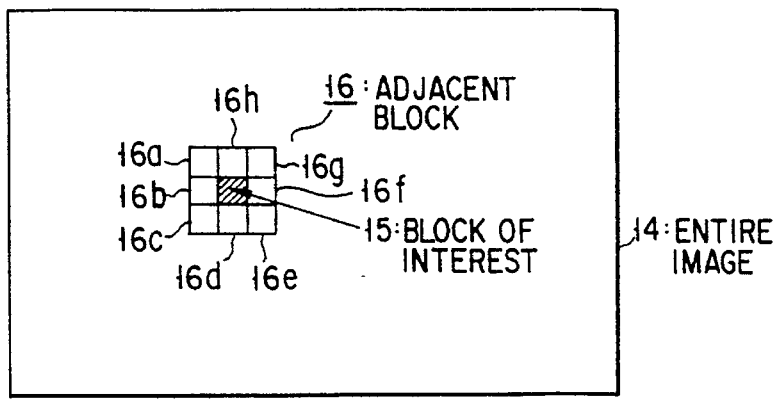
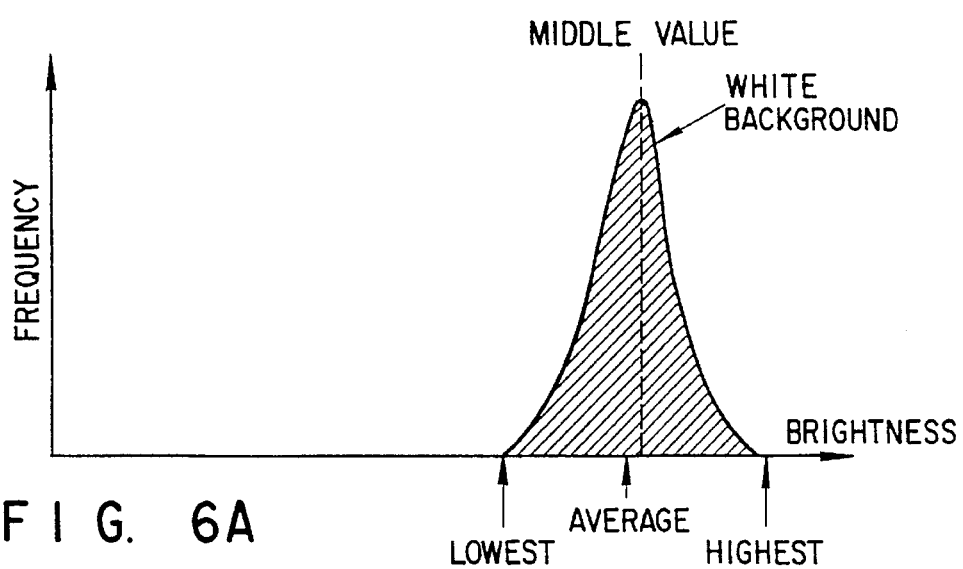
FIG. 6A
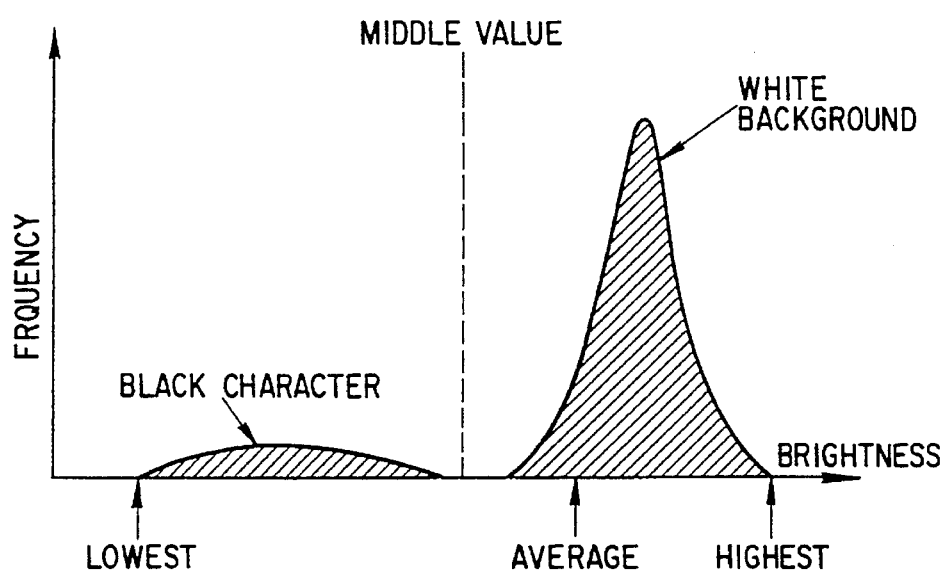
FIG. 6B

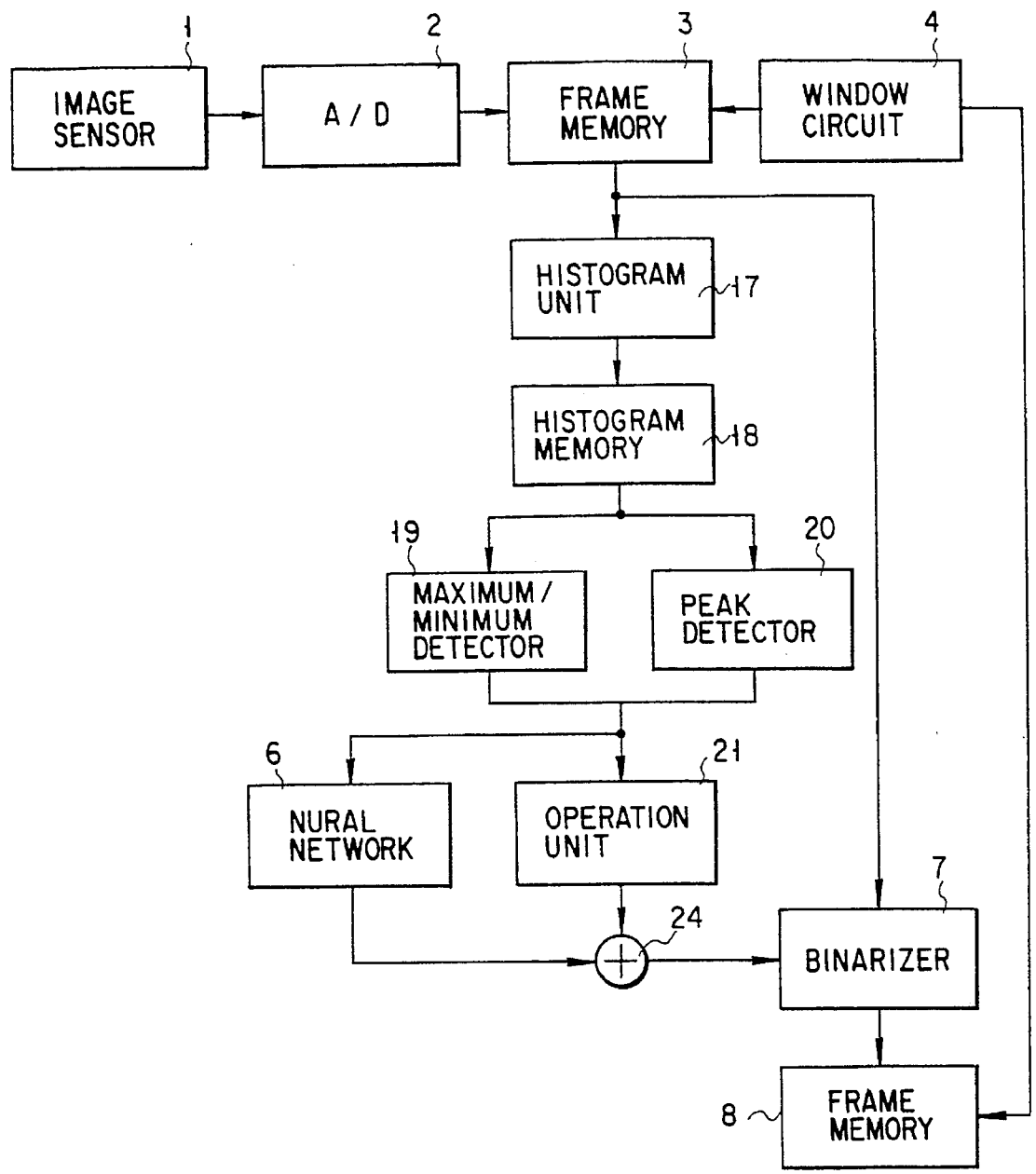
F I G. 7

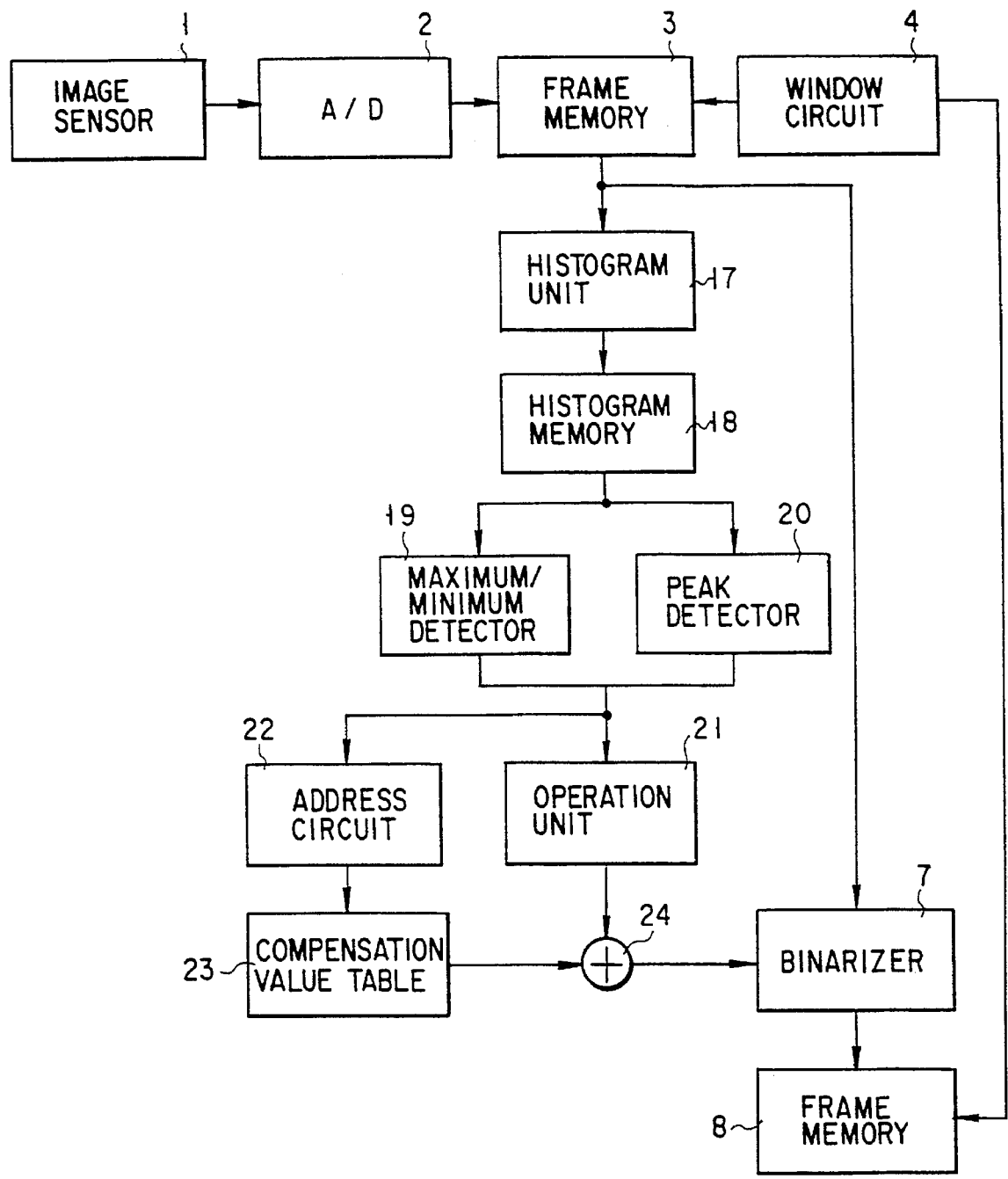
F I G. 8

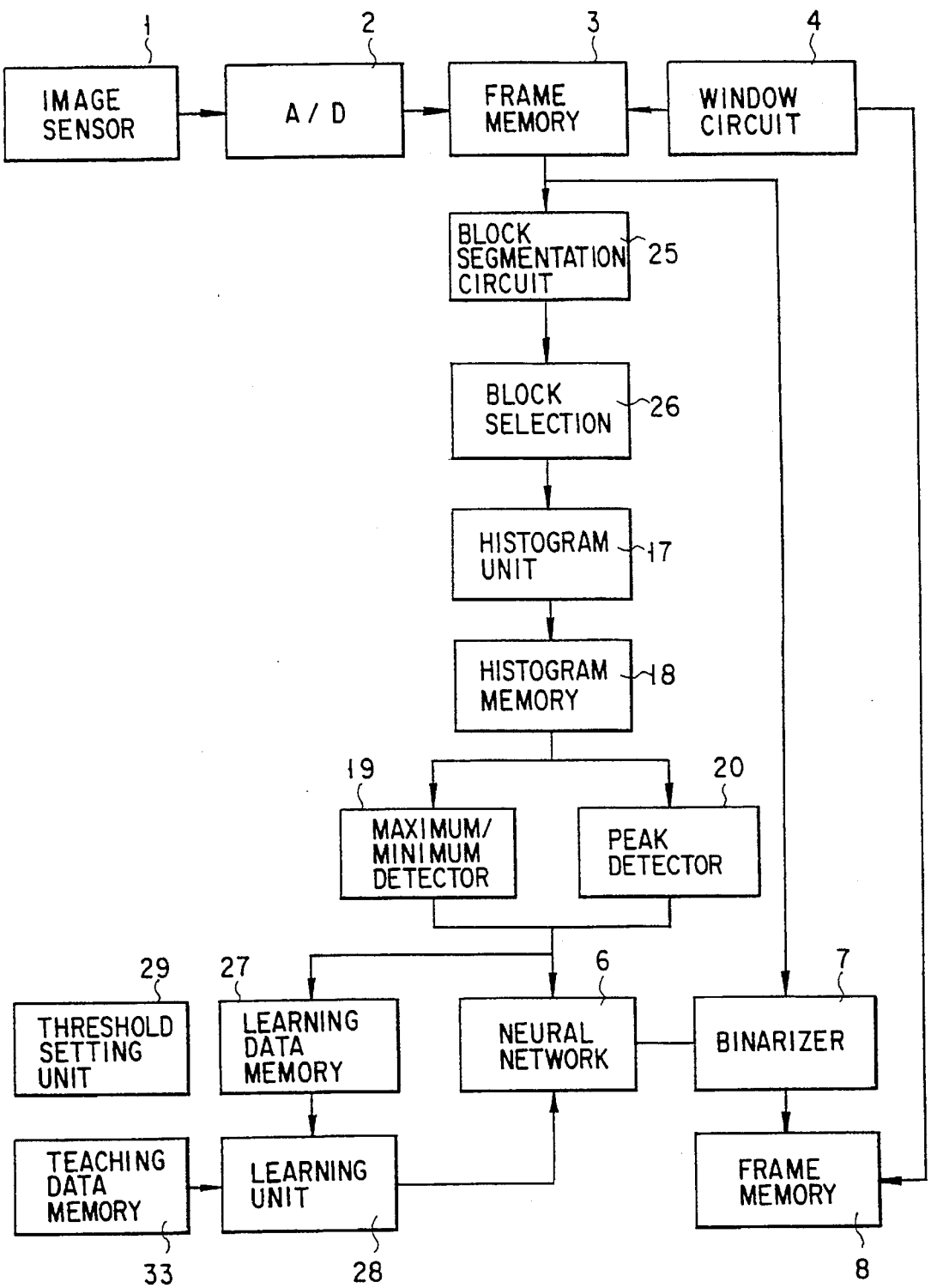
F I G. 14

FIG. 15A.
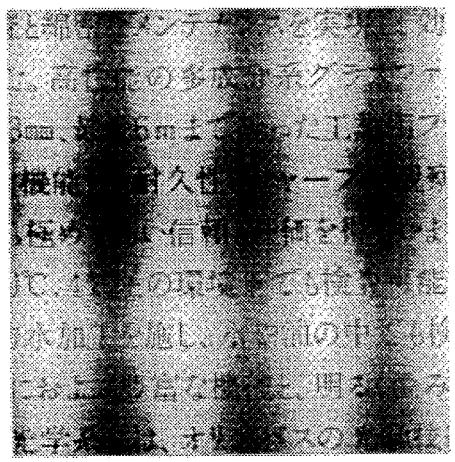
INPUT IMAGE
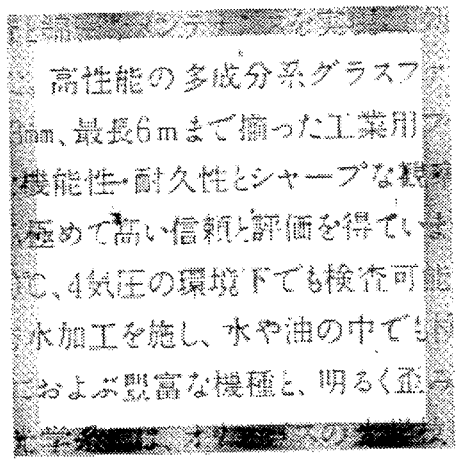
FIG. 15B
BINARIZED IMAGE
BY THIS EMBODIMENT
FIG. 15C
BINARIZED IMAGE BY
DISCRIMINANT ANALYSIS

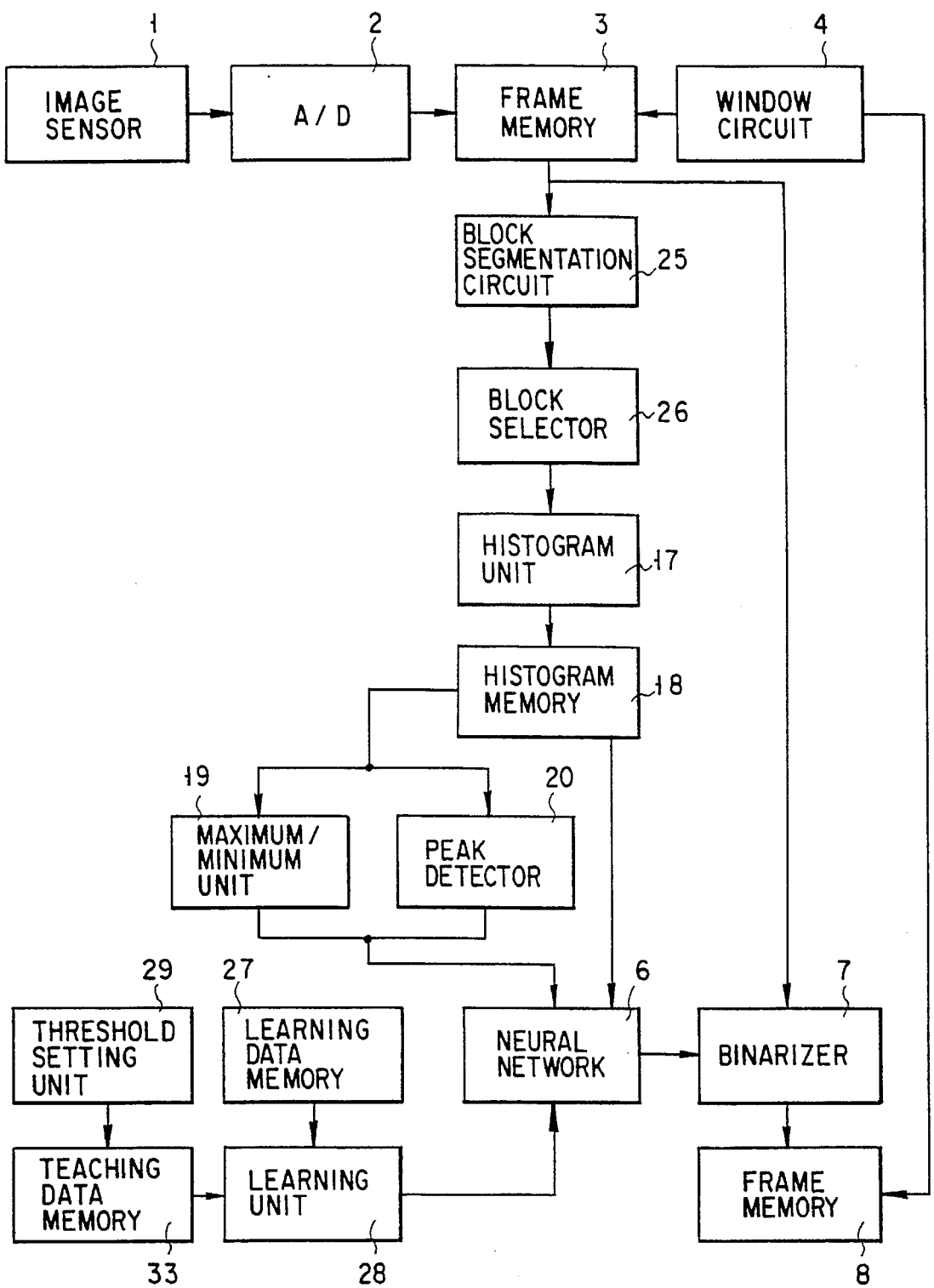
F I G. 16

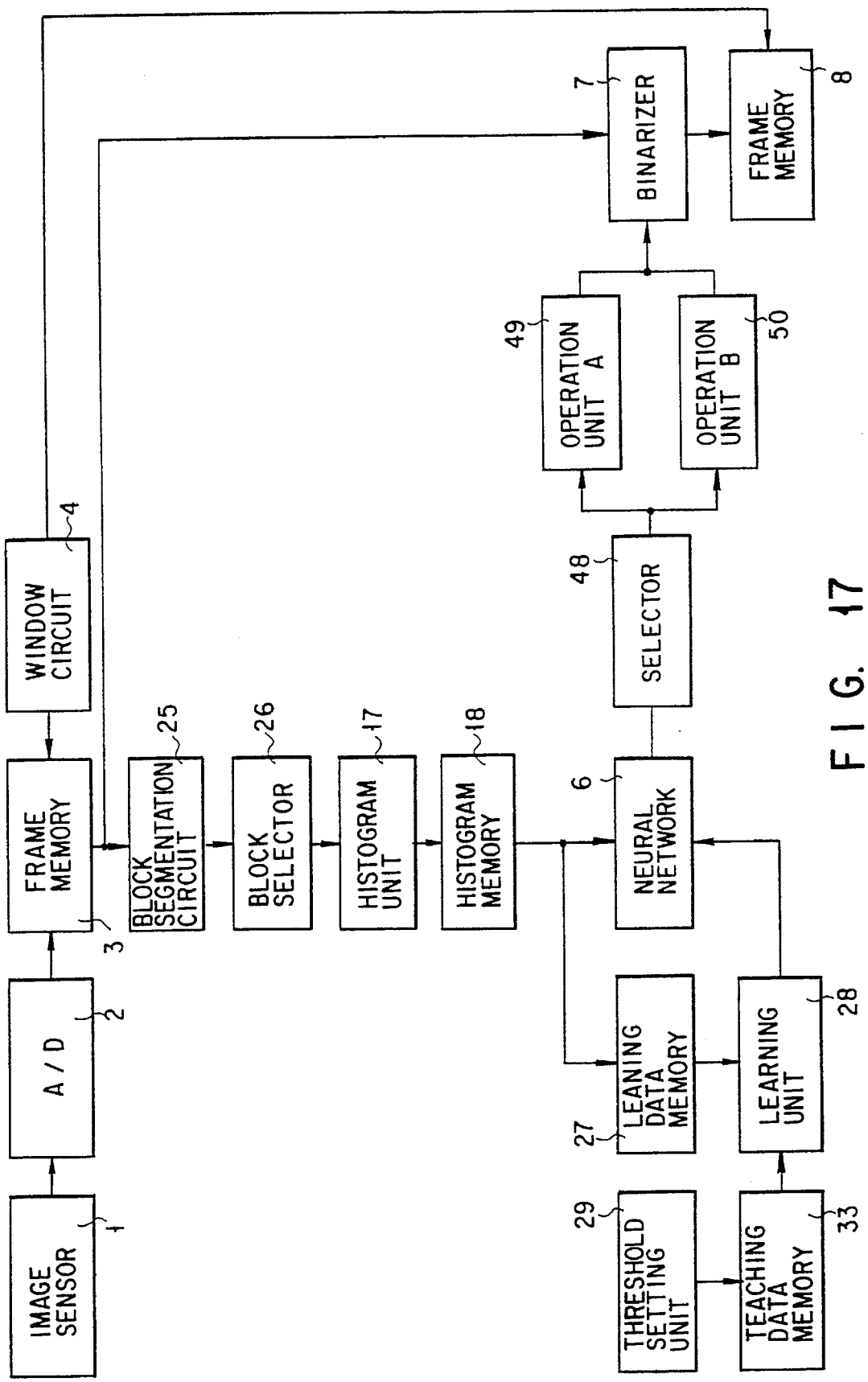
F I G. 17

IMAGE BINARIZING APPARATUS

This application is a Continuation, of application Ser. No. 08/125,602, filed Sep. 23, 1994 now abandoned.

BACKGROUND OF THE INVENTION

1. Field of the Invention

The present invention relates to an image binarizing apparatus suitable for binarizing image data.

2. Description of the Related Art

In general, copying machines and facsimile apparatuses perform binarization on an image with a gray scale to make clear the character image drawn on an input sheet of paper or the like before printing it out or transmission.

Normally, a threshold value is previously determined by a histogram that represents the brightness distribution, and it is determined that individual pixels of the input image are "white" when their values are higher than the threshold value and "black" their values are lower than the threshold value.

Actually, however, there is no fixed standard for the correlation between the histogram and the threshold value and the threshold value may not be set properly. Accordingly, the pixels may not always be binarized properly. The shape of the reference histogram differs greatly depending on the difference in the light source or illumination and on the image to be sensed.

As the first prior art to overcome this problem, Otsu has proposed a scheme to statistically determine the optimum threshold value based on the histogram of brightness of an input image in his report "Method of Automatically Selecting Threshold Value Based on Discrimination and Least Square Rule" (Electronic Information Communication Committee Report D, Vol. J63-D, No. 4, pp. 349–356).

As the second prior art, Babaguchi et al. have proposed, in "Connectionist Model Binarization" (International Journal of Pattern Recognition and Artificial Intelligence, vol. 5, No. 4, pp. 629–644, 1991), that a histogram of brightness for the entire input image be prepared and input to a hierarchical neural network having the same number of input units and output units as the number of orders of the histogram, and that the output unit which responds most strongly be used as the threshold value in binarizing the input image.

Proposed as the third prior art by the present applicant is the image binarizing apparatus described and claimed in Japanese Patent No. 4-131051. In this apparatus, a sensed image is divided into partial image blocks, and parameters are acquired from the histograms of brightness of the partial image blocks and input to a neural network, to thereby determining the threshold value. This method, which cannot be performed by the second prior art, can binarize an image of uneven brightness and requires but a neural network of smaller scale than the neural network required in the second prior art.

In the third prior art, too, when the threshold value for binarization is obtained from the histogram of brightness, the partial image blocks are reduced in size if the input image has uneven brightness. In this case, each partial image block contains a smaller number of pixels, and the histogram of the partial image block no longer reflects the statistical characteristic of the partial image block. Consequently, the threshold value obtained from the histograms of brightness of the partial image blocks has but a poor accuracy, rendering it difficult to binarize the input image with precision. It is not absolutely necessary to prepare a histogram of brightness for each partial image block, for the purpose of extracting the parameter of the brightness distribution in the partial image block.

In any prior art described above, an input image is segmented into partial image blocks, and a threshold value is determined by a neural network directly from the pixel-brightness distributions in the partial image blocks. Due to the fuzziness and nonlinearity of the neural network, however, a very accurate threshold value may not be obtained, which is generally required in order to binarize a low-contrast image.

For instance, in the case where the parameters are input to the neural network to directly acquire the threshold value, the range of the output value of the neural network is that of the gray level of the input image. Since an ordinary CCD sensor handles eight bits, 256 levels are available. Suppose 200 levels are given to the background and 50 levels to the character contrast (the difference between the background and the black character portion). Assuming that there is an error of 5% in the output of the neural network, then sufficient binarization is possible by this neural network because 5% of 256 levels yields about 13 levels.

Actually, sufficient illumination may not always be obtained; if only 50 levels are given to the background, the contrast, which has been 50 levels to the 200-level background, becomes 12.5. In this case, the proper binarization cannot be accomplished by the neural network that has an error of 13 levels. It is apparent that the result of the binarization differs depending on the background level.

To allow the neural network to learn to provide a highly accurate output, learning should be performed on a vast amount of sample data, resulting in inevitable enlargement of the network and increase in the learning time.

SUMMARY OF THE INVENTION

It is therefore an object of the present invention to provide an image binarizing apparatus which prepares the optimum threshold value for partial images of an input image and binarizes the image based on that threshold value.

To achieve this object, according to one aspect of this invention, there is provided an image binarizing apparatus comprising photoelectric converting means for photoelectrically converting an image into an electric signal; image signal separating means for separating an image signal acquired from the photoelectric converting means into a predetermined number of portions to yield partial images; extracting means for extracting a small number of parameters from the partial images; threshold value computing means for inputting the extracted parameters to a neural network and causing the neural network to compute a threshold value; and binarizing means for binarizing all or part of pixels of each of the partial images based on the threshold value acquired by the threshold value computing means.

According to another aspect of this invention, there is provided an image binarizing apparatus comprising photoelectric converting means for photoelectrically converting an image into an electric signal; image signal separating means for separating an image signal acquired from the photoelectric converting means into a predetermined number of portions to yield partial images; extracting means for extracting a small number of parameters from the partial images for each of a partial image block of interest and a plurality of partial image blocks adjacent to the partial image block of interest; threshold value computing means for inputting the extracted parameters, extracted from the partial image block of interest and all of the adjacent partial image blocks, to a neural network and causing the neural network to compute a threshold value; and binarizing means for binarizing all or part of pixels of each of the partial images based on the threshold value acquired by the threshold value computing means.

According to still another aspect of the present invention, there is provided an image binarizing apparatus comprising photoelectric converting means for photoelectrically converting an image into an electric signal; image signal separating means for separating an image signal acquired from the photoelectric converting means into a predetermined number of portions to yield partial images; extracting means for extracting a small number of parameters from the partial images; threshold value computing means for acquiring a temporary threshold value based on the parameters extracted by the extracting means; compensation value computing means for inputting the extracted parameters to a neural network and causing the neural network to compute a compensation value for a threshold value compensating means for compensating the temporary threshold value with the compensation value computed by the compensation value computing means, thereby to obtain a high-accuracy threshold value; and binarizing means for binarizing all or some of pixels of each of the partial images based on the high-accuracy threshold value acquired by the compensating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a diagram showing a block of interest in an image and adjoining blocks;

FIGS. 6A and 6B are a model diagram showing the histogram of brightness of a partial image block of a character image;

FIG. 7 is a diagram illustrating the structure of an image binarizing apparatus according to a fourth embodiment of this invention;

FIG. 8 is a diagram illustrating the structure of an image binarizing apparatus according to a fifth embodiment of this invention;

FIG. 14 is a diagram illustrating the structure of an image binarizing apparatus according to a seventh embodiment of this invention;

FIGS. 15A, 15B and 15C are a diagram for explaining the embodiments of this invention in comparison with the prior art schemes;

FIG. 16 is a diagram illustrating the structure of an image binarizing apparatus according to an eighth embodiment of this invention;

FIG. 17 is a diagram illustrating the structure of an image binarizing apparatus according to a ninth embodiment of this invention;

DETAILED DESCRIPTION OF THE PREFERRED EMBODIMENTS

Figure 1:
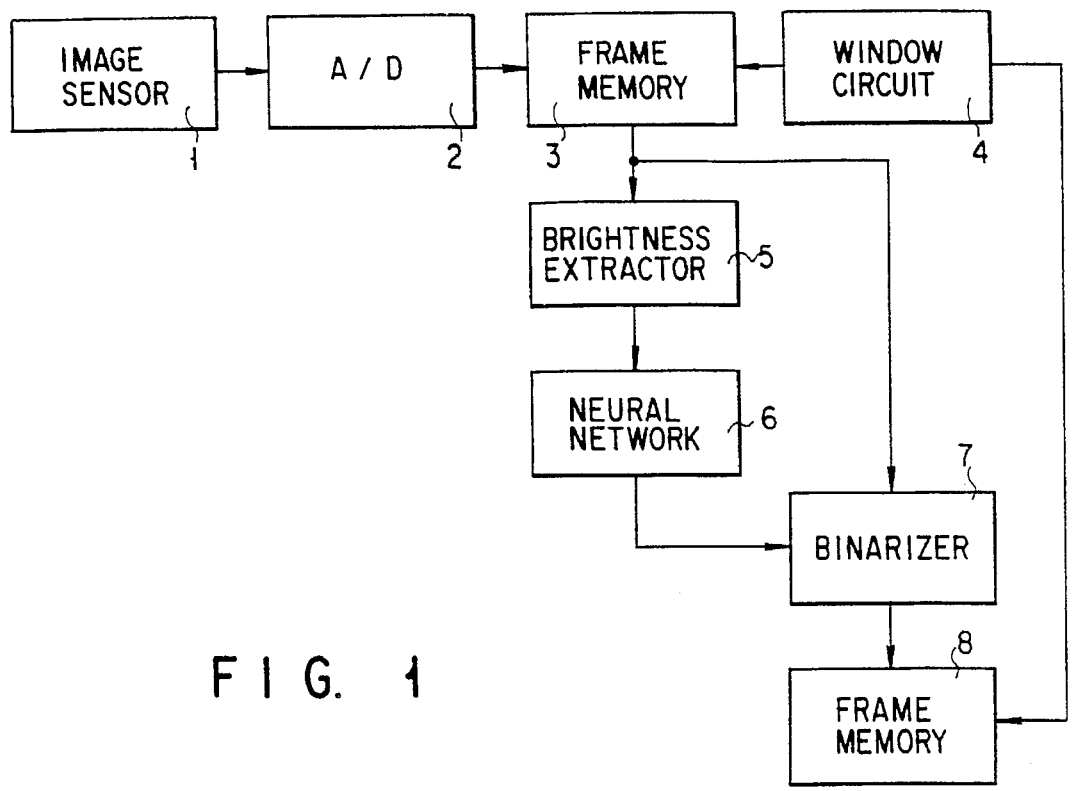
FIG. 1 is a diagram illustrating the structure of an image binarizing apparatus according to a first embodiment of this invention.

Preferred embodiments of the present invention will now be described referring to the accompanying drawings.

To begin with, the outline of an image binarizing apparatus embodying this invention will be described.

The image binarizing apparatus of this invention separates an input image into a plurality of partial images, acquires the highest brightness, lowest brightness and average brightness in the separated partial images, and distinguishes the partial images with those three brightness values.

FIG. 6 shows model histograms of brightness of a partial image block of a character image. FIG. 6B shows an example of the histogram of brightness of a region containing a character on a printed matter having an image printed in black on the white background, and FIG. 6A exemplifies the histogram of brightness of only the white background region on a printed matter which is same as or similar to the printed matter of FIG. 6B.

It is apparent from those diagrams that the distribution range of the brightness is narrow for the white background shown in FIG. 6A while the region containing a character as shown in FIG. 6B has a peak corresponding to the white background and has a distribution corresponding to a black character, which gently stretches in a range extending from this peak toward a lower-brightness region.

For a partial image block having only the white background, the difference between the highest brightness and the lowest brightness is small, whereas for a partial image block containing a character, the difference between the highest brightness and the lowest brightness is large. The average brightness approaches to the middle value between the highest brightness and the lowest brightness for the partial image block of only the white background, and greatly shifts toward the highest brightness side from that middle value for the partial image block containing a character.

With regard to an image having a white character written on the black background, there is a peak corresponding to the block memory and the distribution of the brightness corresponding to a white character gently stretches in a range extending from this peak toward a higher-brightness region. In this case, the average brightness greatly shifts toward the lowest brightness side from the middle value between the highest brightness and lowest brightness. Although the relation between the highest brightness, lowest brightness and average brightness for the region containing the black background alone is the same as that for the region containing the white background alone, those three brightness values are all small.

It is apparent from the above that the highest brightness, lowest brightness and average brightness of a partial image block are proper as parameters to determine whether that partial block is a region of only the white background or black background, or is a region in which a black character is written on the white background or a white character is written on the black background.

FIG. 1 illustrates the structure of an image binarizing apparatus according to the first embodiment of this invention, which will now be described below.

First, an image having characters and/or lines drawn is sensed by an image sensor 1, such as a scanner or a TV camera. The output of this image sensor 1 is digitized by an A/D converter 2 and the resultant digital image is temporarily stored in a frame memory 3.

The image stored in the frame memory 3 is separated into partial image blocks of a predetermined size based on address information generated from a window circuit 4. The partial image blocks are read out, block by block, to a brightness extractor 5. The partial images may overlap each other.

The brightness extractor 5 acquires the highest brightness, lowest brightness and average brightness of the pixels contained in a single partial image block read from the frame memory 3, and sends those values to a neural network 6.

Figure 4:
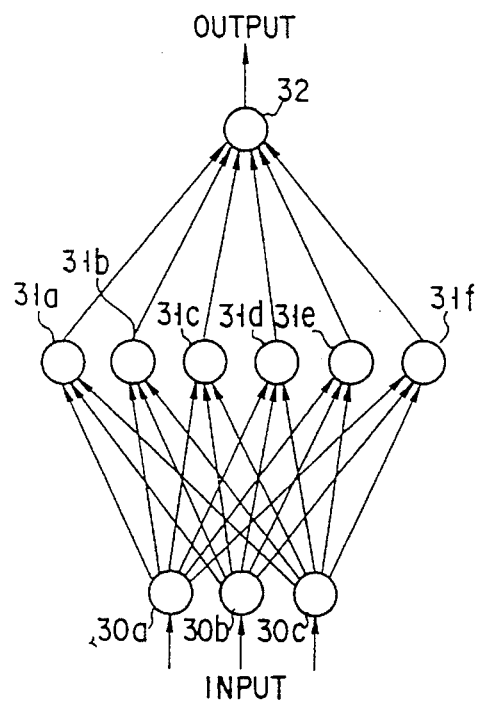
FIG. 4 is a diagram showing the hierarchical structure of a neural network used in this invention.

The neural network 6 has a hierarchical structure as shown in FIG. 4. In this embodiment, individual input units 30a to 30c respectively receive the three brightness values. Each of the input units 30a–30c distributes the received signal to intermediate units 31a to 31f. Each of the units 31a–31f and an output unit 32 has a plurality of input terminals and a single output terminal. Those units each perform the processing expressed in the following equation (1):

$$y = f(\Sigma w_i x_i - \theta) \quad (1)$$

where $x_i$ is an input to the terminal i, $w_i$ is the weight factor of the terminal i, and $\theta$ is a bias value. The item "f" is a Sigmoid function as expressed by the following equation (2) in the intermediate units 31a–31f, and is f(x)=x in the output unit 32.

$$f(x) = 1/(1+e^{-x}) \quad (2)$$

The neural network 6 is designed to learn by the generalized delta rule learning method established by D. E. Rumelhart et al. (the PDP Research Graoup (Eds.) "Parallel Distributed processing" Vol. 1 (MIT Press, 1988) and the weight factors $w_i$ of the intermediate units 31a–31f and the output unit 32 and the bias value $\theta$ are previously determined, so that when receiving the aforementioned highest brightness, lowest brightness and average brightness output from the brightness extractor 5, the neural network 6 outputs the optimum threshold value.

Figure 13:
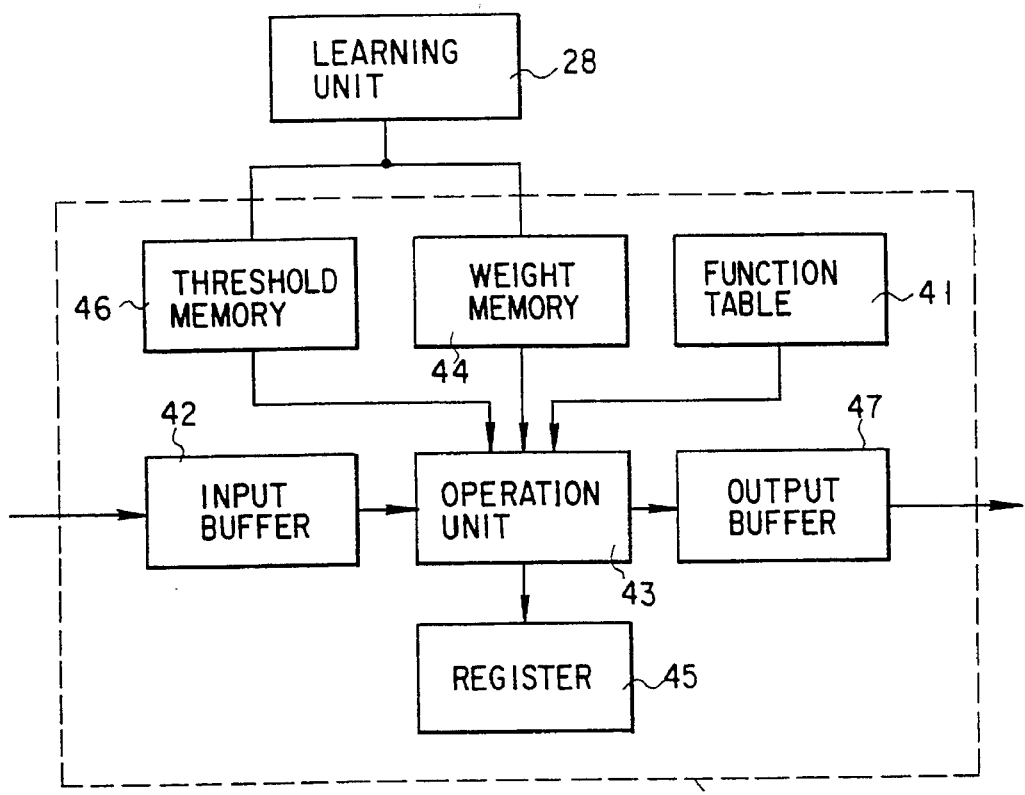
FIG. 13 is a diagram showing the structure of each neuron unit.

FIG. 13 is a block diagram showing one of the neuron units 31a–31c and 32. The relation between x and f(x) in the equation (4) is stored in a function table 41 of each of the intermediate neuron units 31a–31c. The weight Wi (i=1, 2, 3 ..., N) and the threshold value $\theta$ in the equation (3) for each of the neuron units 31a–31c and 32 are determined by the generalized delta rule learning method (to be described later). The following description is, however, based on the assumption that the weight and threshold value are predetermined.

The intermediate neuron units 31a–31c of the neural network each receive brightness data from a brightness extractor 5, which represents the brightness of the brightest pixel, that of the least bright pixel, and the brightness of the mean-brightness pixel, all contained in each partial image block. The brightness data is supplied via an input buffer 42 to an operation unit 43. The unit 43 computes the product and sum of the weight data items stored in a weight memory 44. The product and the sum are accumulated in a register 45.

Then, the value stored in a threshold memory 46 is subtracted from the value obtained by the operation unit 43 and stored in the register 45. As a result, the register 45 holds the results of the computation performed on the part in the parentheses in the equation (1), which is given as follows:

The intermediate neuron units 31a–31c of the neural network 6 each receive the histogram data of brightness of nine blocks of partial images, namely one partial image block of interest and eight adjoining partial image blocks, from the histogram memory 18 via the associated branching terminals 30a–30c. The input histogram data is sent via an input buffer 42 to an operation unit 43. Based on the histogram data of brightness of the nine blocks of partial images, the operation unit 43 computes the product of the frequency data for each brightness and weight data for this frequency, stored in a weight memory 44, and then computes the sum of the obtained products for the individual brightnesses. The computation result is stored in a register 45.

Then, a value stored in a threshold memory 46 is subtracted from the value stored in the register 45 and the result is stored again in the register 45. As a result, the register 45 will hold the result of the computation of the part in the parentheses in the equation (1), which is given below.

$$\sum_{i=1}^{m} W_i x_i - \theta \quad (3)$$

The value of the Sigmoid function for the value stored in the register 45 is obtained from the function table 41, and is output through an output buffer 47 as the output of the associated one of the intermediate neuron units 31a–31c. The output neuron unit 32 reads out the outputs of the intermediate neuron units 31a–31c one by one in order.

Figure 12:
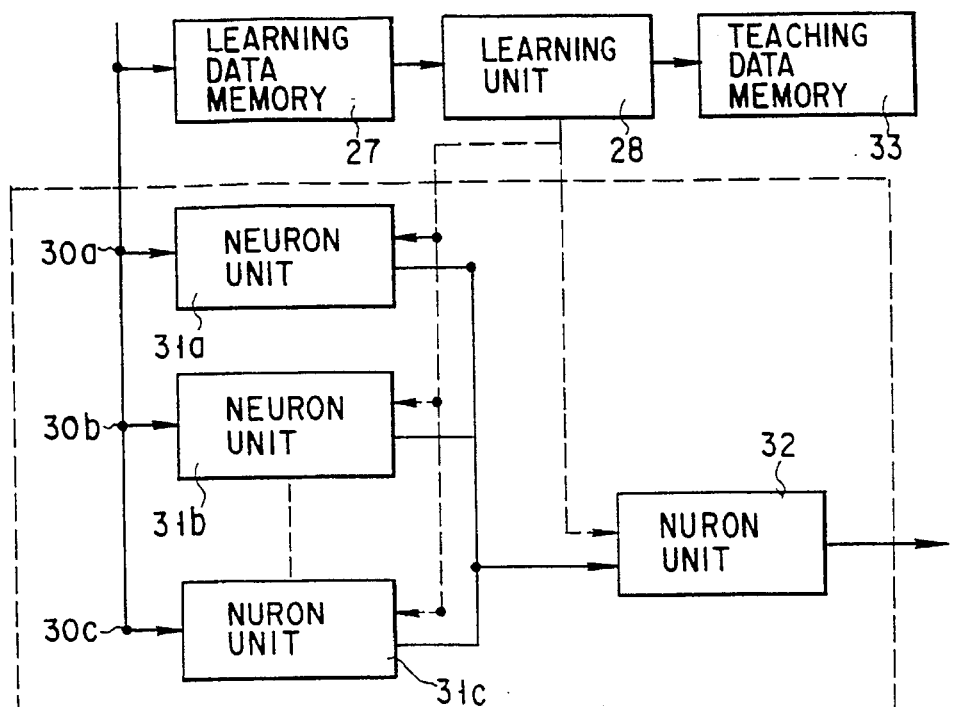
FIG. 12 is a diagram showing the structure of a neural network.

First, the output of the intermediate neuron unit 31a in FIG. 12 is read and is input to the output neuron unit 32. The input of this output neuron unit 32 is supplied to the operation unit 43 via the input buffer 42 shown in FIG. 13. The operation unit 43 computes the product of the output value of the intermediate neuron unit 31a and the first value in the weight memory 44. The computation result is stored in the register 45.

Likewise, the output of the intermediate neuron unit 31*b* is read next and is input to the operation unit 43 of the output neuron unit 32 via the input buffer 42. The operation unit 43 computes the product of the output value of the intermediate neuron unit 31*b* and the second value in the weight memory 44. The computation result is added to the value held in the register 45.

The above processing is repeated for all the intermediate neuron units. After the processing for the outputs of all the intermediate neuron units is complete, the value stored in the threshold memory 46 is subtracted from the value held in the register 45. Accordingly, the register 45 will hold the result of the computation given by the equation (1).

The value of this computation result is output via the output buffer 47 as the output value of the neural network 6.

The output of the neural network 6 is sent to a binarizer 7. The binarizer 7 binarizes each pixel of the partial image block read from the frame memory 3 based on the result of comparison between the brightness of that pixel with the output of the neural network 6 taken as a threshold value. When the brightness of a pixel is higher than the output value of the neural network 6, the pixel is stored as a "white pixel" at a predetermined address in the frame memory 3, and when the brightness of the pixel is lower than the output value of the neural network 6, the pixel is then stored as a "black pixel" at a predetermined address in the frame memory 3.

The window circuit 4 sets partial image blocks in the frame memory 3 and designates addresses, corresponding to the partial image blocks in the frame memory 3, into another frame memory 8. In binarizing a partial image block of interest, the original partial image block and a new partial image block may partly overlap in some case. When the processing is complete for all the partial images of the input image stored in the frame memory 3, the input image is stored in a binarized form in the frame memory 8.

Figure 2:
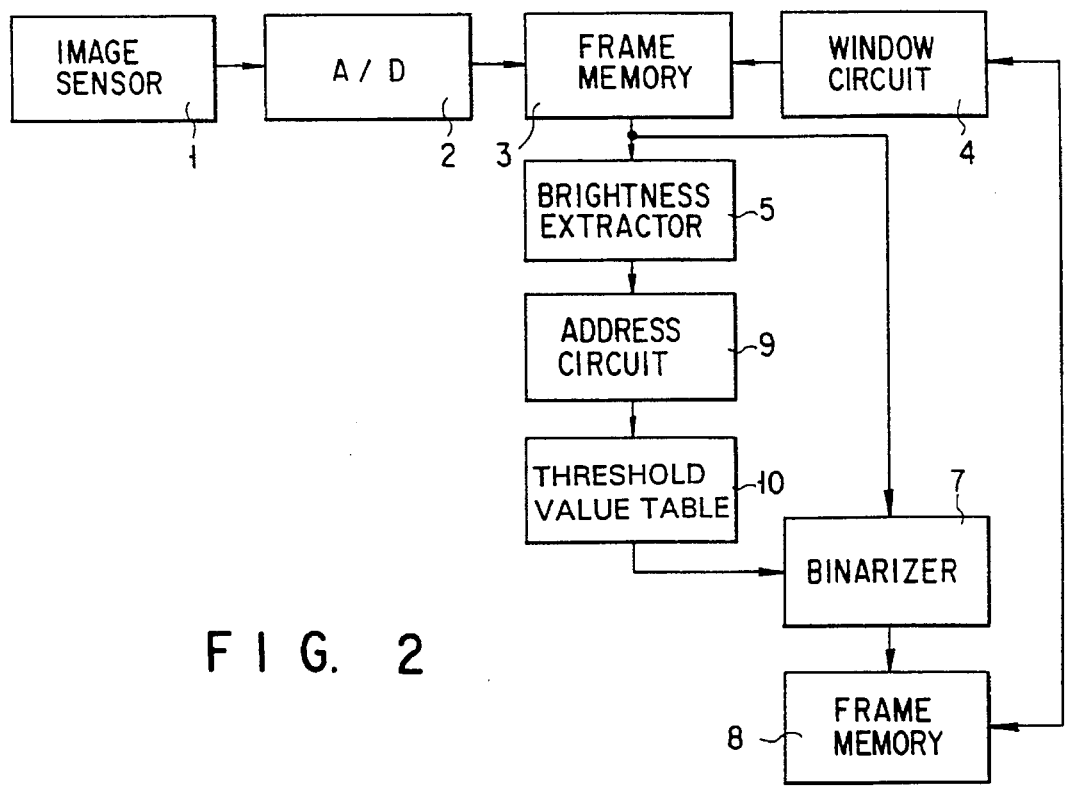
FIG. 2 is a diagram illustrating the structure of an image binarizing apparatus according to a second embodiment of this invention.

A description will now be given of an image binarizing apparatus according to the second embodiment of this invention, whose structure is illustrated in FIG. 2. In the above-described first embodiment, the highest brightness, lowest brightness and average brightness are input to a neural network which in turn obtains the threshold value based on those values. As the neural network basically has a parallel processing structure, it is not efficient to accomplish the processing by a currently-typical sequential processor in the viewpoint of the processing time. In the second embodiment, a table lookup scheme is used as means to obtain a threshold value instead of the neural network.

As in the first embodiment, the brightness extractor 5 acquires the highest brightness, lowest brightness and average brightness from each partial image block of image data stored in the frame memory 3 and sends those values to an address circuit 9. The address circuit 9 quantizes the three types of brightness values, sent from the brightness extractor 5, to predetermined levels, and uses the three quantized levels as an address to read a threshold value corresponding to that address from a threshold value table 10. Stored in the threshold value table 10 are threshold values associated with the individual addresses each of which is represented by the three types of quantized brightnesses obtained in advance in a neural network.

The value read from the threshold value table 10 is sent to the binarizer 7. The subsequent processing is the same as that of the first embodiment, and a binarized image will be stored in the frame memory 8. The address circuit 9 may prepare a one-dimensional address from the three types of brightnesses through vector quantization instead of preparing the aforementioned three-dimensional address. In this case, the lookup table should of course be one dimensional.

Figure 3:
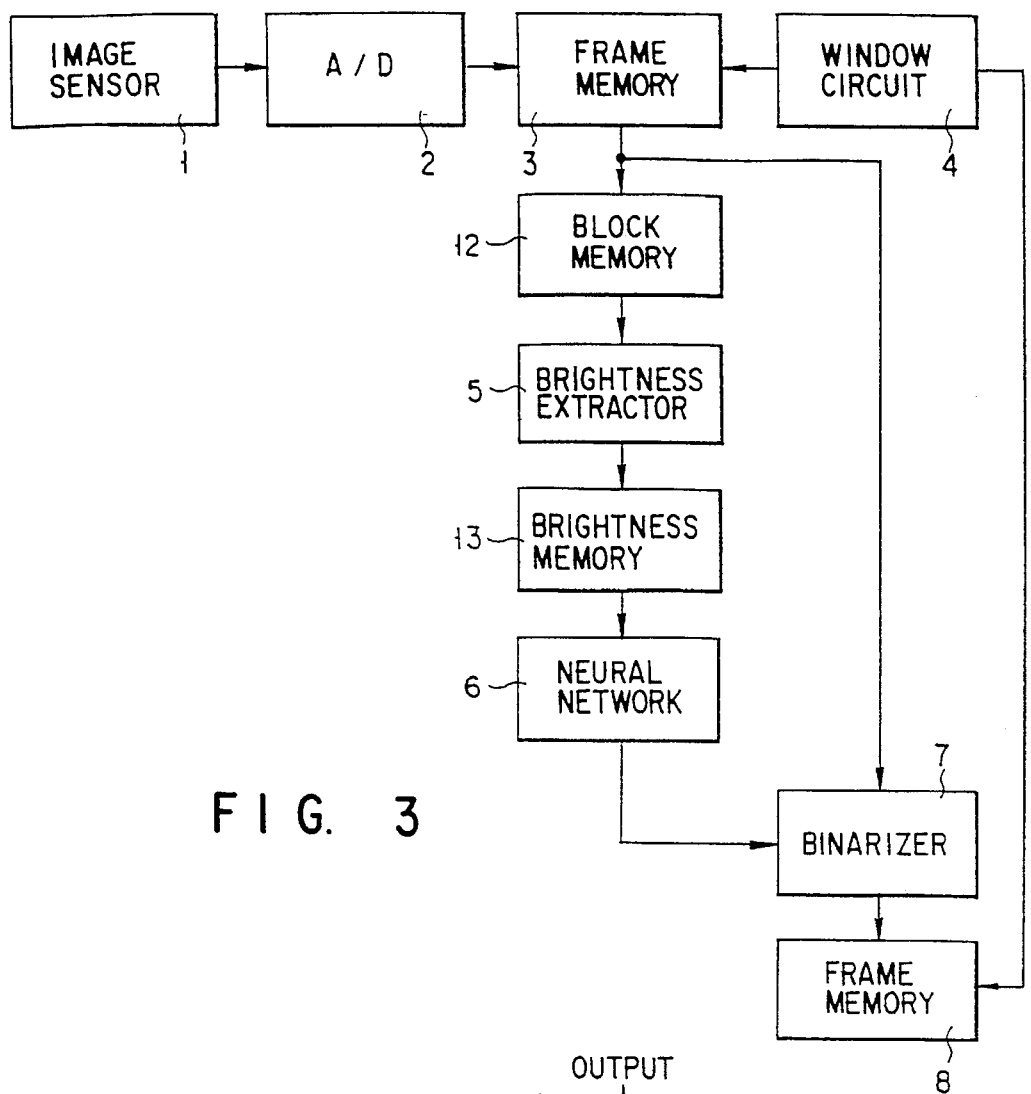
FIG. 3 is a diagram illustrating the structure of an image binarizing apparatus according to a third embodiment of this invention.

A description will now be given of an image binarizing apparatus according to the third embodiment of this invention, whose structure is illustrated in FIG. 3. The third embodiment differs from the first embodiment in that the threshold value of a single partial block is determined by the highest brightness, lowest brightness and average brightness of that partial block in the first embodiment, whereas in this embodiment, as shown in FIG. 5, the highest brightness, lowest brightness and average brightness are obtained for each of a block of interest and a plurality of blocks adjoining that block of interest and the threshold value for the block of interest is determined based on the acquired values by a neural network. Since the spatial distribution of the brightness of the white background can be learned in this embodiment, the proper threshold value can be determined even if there is considerable unevenness of illumination.

In this image binarizing apparatus, as in the above-described first embodiment, an image sensed by the image sensor 1 is digitized by the A/D converter 2 and the digital image is then temporarily stored in the frame memory 3. A partial image block of interest of a predetermined size and a plurality of adjoining partial image blocks of the image stored in the frame memory 3 are read out therefrom based on address information generated by the window circuit 4, and are stored in a block memory 12. The brightness extractor 5 sequentially reads the partial image block of interest and the adjoining partial image blocks from the block memory 12, acquires the highest brightness, lowest brightness and average brightness of the pixels contained in each block and stores the obtained values into a brightness memory 13. When all the partial image blocks stored in the block memory 12 are read out, the neural network 6 collectively reads out plural sets of the highest brightness, lowest brightness and average brightness from the brightness memory 13. While this neural network has the same structure as that of the first embodiment, the number of the input units equals three times a value obtained by adding "1" to the number of the adjoining blocks. The neural network 6, as in the first embodiment, has previously learned based on the aforementioned generalized delta rules in such a way as to provide the optimal threshold value for the received plural sets of the highest brightness, lowest brightness and average brightness. The output of the neural network 6 is sent to the binarizer 7. The subsequent processing is the same as that of the first embodiment, and a binarized image will be stored in the frame memory 8.

In the above-described first to third embodiments, three types of parameters, namely the highest brightness, lowest brightness and average brightness, are extracted from each partial image block, and the threshold value is determined based on the parameters by the neural network or the table lookup scheme using a table showing the input/output relation of the neural network. Those embodiments are characterized by the fast processing that has resulted from the direct extraction of the parameters from the partial blocks.

To obtain a highly accurate threshold value, it is better to use a larger number of parameters. In this respect, image binarizing apparatuses according to the fourth and fifth embodiments to be described below are designed not to use only the three types of brightnesses as parameters but to prepare the histogram of brightness from the aforementioned partial image block and extract parameters from this histogram.

The outline of the image binarizing apparatus according to the fourth embodiment will be described below.

Figure 9A:
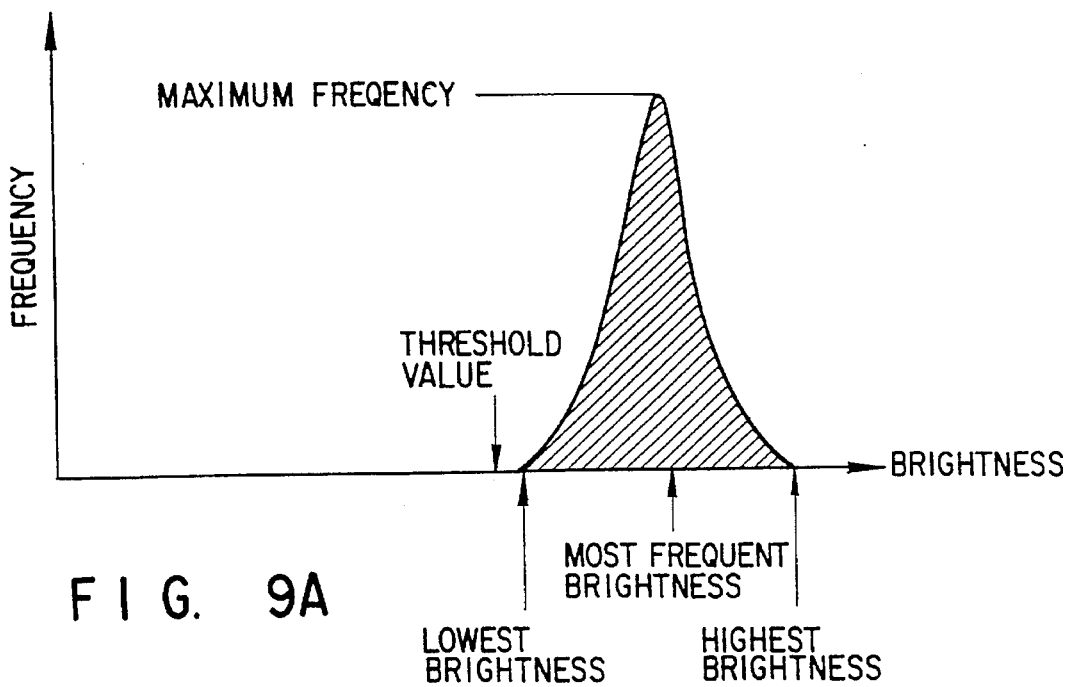
FIGS. 9A and 9B are a model diagram showing the histogram of brightness of a partial image block of a character image.
Figure 9B:
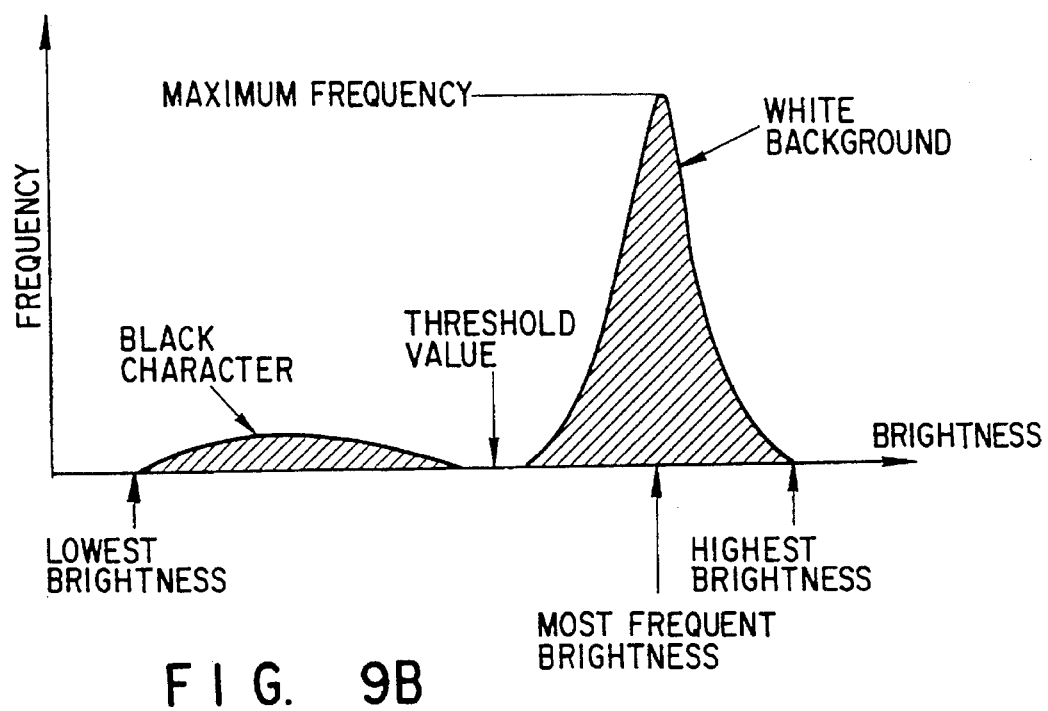

FIG. 9 shows a model histogram of brightness of a partial image block of a character image. FIG. 9B shows an example of the histogram of brightness of a region containing a character on a printed matter having an image printed in black on the white background. FIG. 9A presents the histogram of brightness of only the white background region. It is apparent from those diagrams that the white background region has a narrow brightness distribution.

With regard to the character containing region shown in FIG. 9B, there is a peak corresponding to the white background and the distribution of the brightness corresponding to a black character gently stretches in a range extending from this peak toward a lower-brightness region. For the partial image block containing only the white background, the difference between the highest brightness and lowest brightness is small and the ratio of the peak to the entire area of the histogram is large. For the partial image block containing a character, however, the difference between the highest brightness and lowest brightness is large and the ratio of the peak to the entire area of the histogram is small.

If a partial image extracted from the input image is a region with only the white background, the threshold value is to be set to a lower brightness than the lowest brightness.

If the extracted partial image contains a character, the threshold value is to be set lower than the highest brightness of the white background and higher than the lowest brightness of a character.

In this embodiment, the highest brightness and lowest brightness of the pixels contained in a partial image block, the most frequent brightness (the brightness that most frequently has occurred), and the ratio of the maximum frequency to the number of the pixels in the partial image block are representative of the features of that partial image block and are used as learning data, while the difference between a temporary threshold value computed from one or more of the parameters obtained from the histogram and the optimum threshold value is used as teaching data. The neural network thus learns using the learning data and teaching data.

Like or same reference numerals as used for the components of the first embodiment shown in FIG. 1 will be given to corresponding or identical components of the image binarizing apparatus shown in FIG. 7 to avoid repeating their description.

First, an image having characters and/or lines drawn is sensed by the image sensor 1, such as a scanner or a TV camera. The output of this image sensor 1 is digitized by the A/D converter 2 and the resultant digital image is temporarily stored in the frame memory 3. The image stored in the frame memory 3 is separated into partial image blocks of a predetermined size based on address information generated from the window circuit 4. The partial image blocks are read out, block by block, to a histogram unit 17. Stored in a histogram memory 18 are addresses corresponding to the brightnesses of the individual pixels.

The histogram unit 17 obtains a histogram for each pixel of the read partial image block, adds "1" to the selected address from the histogram memory 18 and stores the resultant value. Before the image sensor 1 senses an image, the contents of the entire addresses of the histogram memory 18 are initialized to "0."

when reading of one block of partial image from the frame memory 3 is complete, the histogram of brightness as shown in FIG. 9 will be stored in the histogram memory 18.

Then, a maximum/minimum detector 19 acquires the highest brightness and lowest brightness from the histogram of brightness stored in the histogram memory 18. A peak detector 20 acquires the ratio of the most frequent brightness to the number of pixels in a partial image from the histogram of brightness stored in the histogram memory 18.

The obtained parameters are sent to an operation unit 21 and the neural network 6. The operation unit 21 computes a temporary threshold value based on at least one type of parameter obtained from the histogram.

The temporary threshold value is obtained by, for example, multiplying the average brightness by a predetermined coefficient. In the case of a document image having text written in black on the white background, the proper coefficient would be 0.8 to 0.9. The temporary threshold value may be obtained by multiplying the middle value between the highest brightness and lowest brightness, not the average brightness, by a predetermined coefficient, or multiplying the highest brightness by a predetermined coefficient.

The threshold value computed by the operation unit 21 is added to the output of the neural network 6 by an adder 24, and the resultant value is sent to the binarizer 7. The binarizer 7 binarizes each pixel of the partial image block read from the frame memory 3 with the threshold value compensated by the adder 24. When the brightness of a pixel is higher than the corrected threshold value, the pixel is stored as a "white pixel" at a predetermined address in the frame memory 3, and when the brightness of the pixel is lower than the corrected threshold value, the pixel is then stored as a "black pixel" at a predetermined address in the frame memory 3.

The window circuit 4 sets partial image blocks in the frame memory 3 and designates addresses, corresponding to the partial image blocks in the frame memory 3, into another frame memory 8. When the processing is complete for all the partial images of the input image stored in the frame memory 3, the input image is stored in a binarized form in the frame memory 8.

A description will now be given of an image binarizing apparatus according to the fifth embodiment of this invention, whose structure is illustrated in FIG. 8.

The fifth embodiment differs from the above-described fourth embodiment in the following point. In the fourth embodiment, the highest brightness, lowest brightness, most frequent brightness and the maximum frequency, which are obtained by the maximum/minimum detector 19 and the peak detector 20, are input to the neural network 6, and the output of the neural network 6 is added to the temporary threshold value to compensate for the threshold value, thus accomplishing the means for compensating for the temporary threshold value. As the neural network basically has a parallel processing structure, it is not efficient to accomplish the processing by a currently-typical sequential processor in the viewpoint of the processing time. In the fifth embodiment, therefore, a table lookup scheme is used as the means to obtain a compensation value for the threshold value instead of the neural network.

In this image binarizing apparatus, as in the fourth embodiment, the maximum/minimum detector 19 acquires the highest brightness and lowest brightness from the histogram of each partial image block stored in the histogram memory 18, and the peak detector 20 obtains the most frequent brightness, and the ratio of the maximum frequency to the number of pixels of the partial image.

The obtained parameters are sent to the operation unit 21 and an address circuit 22. The operation unit 21 computes a temporary threshold value based on at least one type of parameter obtained from the histogram as done in the fourth embodiment. The address circuit 22 may prepare a one-dimensional address from the fourth types of parameters through vector quantization instead of preparing the aforementioned fourth-dimensional address. In this case, the lookup table should of course be one dimensional.

The address circuit 22 quantizes the four types of brightness values to predetermined levels, and uses the four quantized levels as an address to read a compensation value from a compensation value table 23. Stored in the compensation value table 23 are compensation values for the threshold value associated with the individual addresses each of which is represented by the four types of quantized brightnesses obtained in advance in a neural network (not shown).

The temporary threshold value computed by the operation unit 21 is added to the compensation value read from the compensation value table 23 in the adder 24, and the resultant value is sent to the binarizer 7. The subsequent processing is the same as that of the fourth embodiment, and a binarized image will be stored in the frame memory 8.

According to the fourth and fifth embodiments, therefore, the threshold value is not obtained directly from the parameters acquired from the histogram of brightness of a partial image of the input image, but a temporary threshold value is computed first, and the optimum threshold value is determined by the compensation value which is obtained by the neural network based on the temporary threshold value.

In the image binarizing apparatus with the above structure, an input image is separated into a plurality of partial blocks, the highest brightness, lowest brightness and average brightness are obtained for each partial image block, the three types of brightness values are input to the neural network, and the threshold value is determined on the basis of the output of the neural network or the threshold value is determined by a table lookup scheme using the input/output relation of the neural network prepared in advance as a table.

This image binarizing apparatus separates the input image into a plurality of partial blocks, obtains one parameter or a plurality of parameters for each partial image block, and computes a temporary threshold value using one or more than one parameter. A compensation value for the threshold value is acquired from this single or more than one parameter by the neural network. By acquiring a temporary threshold value and only a compensation value for the threshold value is computed by the neural network as described above, the range of the output of the neural network is narrowed to relatively reduce an output error, thus decreasing the influence of fuzziness the neural network has.

From the above, the image binarizing apparatus according to this embodiment of the present invention first computes a temporary threshold value from the parameters obtained from the histogram of a partial image block, and corrects the temporary threshold value with the compensation value acquired by the neural network to determine the optimum threshold value based on which binarization of the input image can be executed. Alternatively, a temporary threshold value may be determined from a small number of parameters may be obtained without preparing the histogram of brightness of a partial image, and image binarization may be performed based on a temporary threshold value that is determined from the parameters.

In short, the present invention can provide an image binarizing apparatus which determines the optimum threshold value for partial images of an input image and conducts image binarization using this threshold value.

A description will now be given of an image binarizing apparatus according to the sixth embodiment of this invention. The following describes how to set a threshold value for the histogram of brightness of an image in this embodiment.

First, an input image is separated into a plurality of partial images, and a histogram of brightness is prepared and used as the characterizing part of each segmented partial image.

Figure 19A:
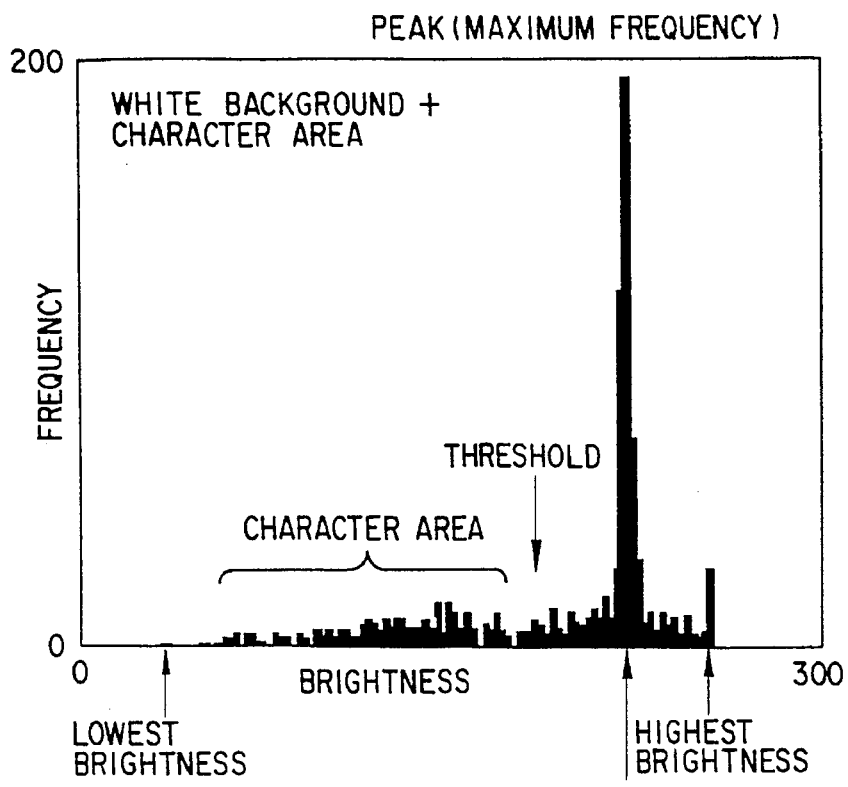
FIG. 19A shows an example of the histogram of brightness of a region containing a character on a printed matter having an image printed in black on the white background, and FIG. 19B exemplifies the histogram of brightness of only the white background region on a printed matter which is the same as or similar to the printed matter of FIG. 19A.
Figure 19B:
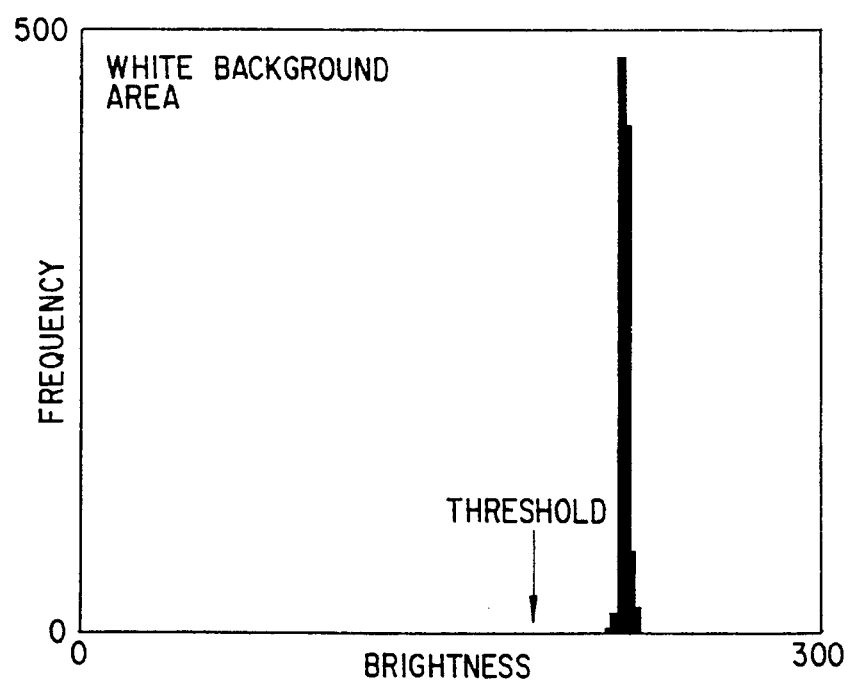

FIGS. 19A and 19B present examples of the histogram of brightness of a 32×32 partial image of an actual character according to this embodiment. FIG. 19A shows an example of the histogram of brightness of a region containing a character on a printed matter having an image printed in black on the white background. FIG. 19B shows the histogram of brightness of only the white background region on a printed matter which is the same as or similar to the printed matter of FIG. 19A.

If a partial image extracted from the input character image is a region with only the white background, the threshold value is to be set to a lower brightness than the lowest brightness. For a character containing region, however, the threshold value is to be set lower than the most frequent brightness and higher than the lowest brightness.

To set the optimum threshold value for each partial image, it is best that a user should conduct the setting while viewing the images binarized with various set values.

In the sixth embodiment and subsequent embodiments of this invention, a partial image of interest and eight partial images adjoining to this partial image of interest are extracted from a plurality of partial images, histogram data of brightness for each of the nine partial images is input to the neural network, and the partial images are binarized using the output value of the neural network as a threshold value.

The highest brightness and lowest brightness of the pixels contained in a partial image, the most frequent brightness, and the ratio of the maximum frequency to the number of the pixels for the entire histograms are input as the representative features of that partial image to the neural network, and the partial image is binarized using the output value of this neural network as a threshold value. Further, histograms for a plurality of partial images extracted from one sample character image or a plurality of sample character images are prepared, the highest brightness, lowest brightness and most frequent brightness of each partial image and the ratio of the maximum frequency to the number of pixels for the entire histograms are used as learning data, and the optimum threshold value for the partial image is used as teaching data. The neural network thus learns using the learning data and teaching data.

Figure 10:
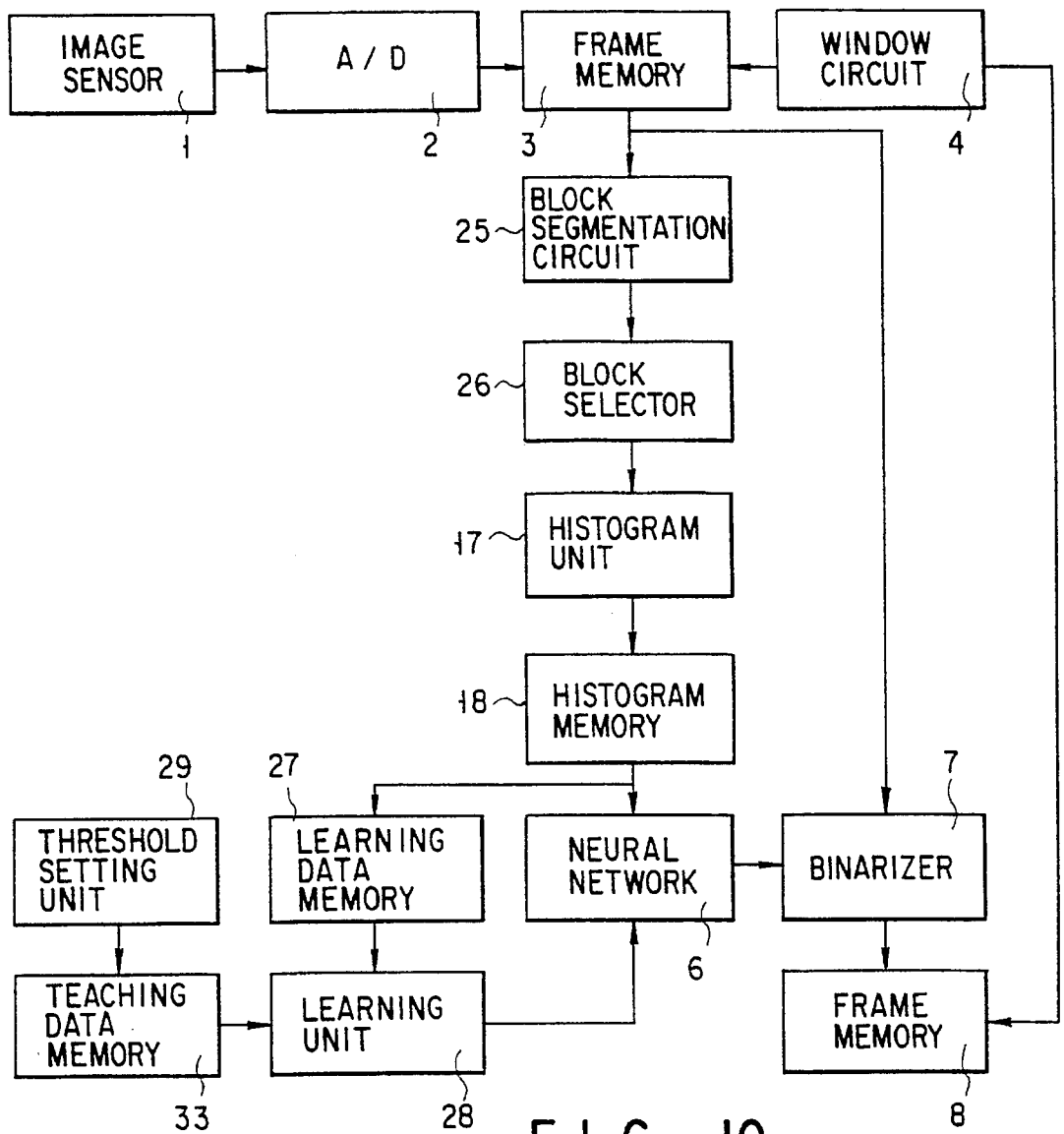
FIG. 10 is a diagram illustrating the structure of an image binarizing apparatus according to a sixth embodiment of this invention.

FIG. 10 illustrates the structure of the image binarizing apparatus according to the sixth embodiment of this invention. As illustrated, first, a character image is sensed by the image sensor 1, such as a scanner or a TV camera. The output of this image sensor 1 is digitized by the A/D converter 2 and the resultant digital image is temporarily stored in the frame memory 3. The character image is separated into partial image blocks of a predetermined size by a block segmentation circuit 25 based on address information generated from the window circuit 4.

Figure 11:
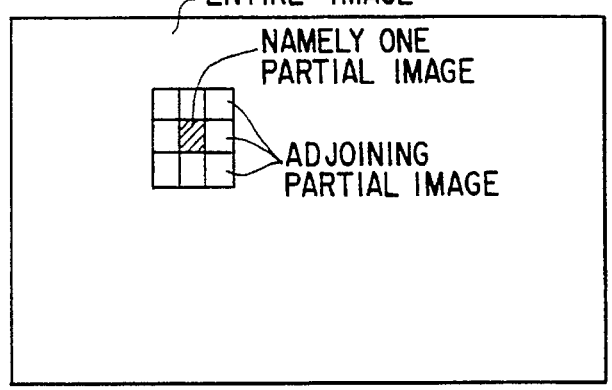
FIG. 11 is a diagram for explaining the relationship between a partial image of interest and adjoining partial images with respect to the entire image.

Then, a block selector 26 selects one partial image block of interest from the plurality of partial image blocks under given conditions, and selects eight blocks surrounding this partial image block of interest as adjoining partial image blocks, as shown in FIG. 11. The partial image block of interest and the eight adjoining partial image blocks are read out, block by block, to the histogram unit 17. For each pixel of the read partial image, the histogram unit 17 adds "1" to the address in the histogram memory 18 which is associated with the brightness of that pixel. Before the image sensor 1 senses a character image, the contents of the entire addresses of the histogram memory 18 are to be initialized to "0."

When reading of nine blocks of partial images, namely one partial image block of interest and eight adjoining partial image blocks, from the frame memory 3 is complete, nine histograms of brightness which are associated with the respective partial images as shown in, for example, FIGS. 19A and 19B, will be stored in the histogram memory 18.

The histogram data of brightness stored in the histogram memory 18 is sent to the neural network 6 and a learning data memory 27.

The intermediate neuron units 31a–31c of the neural network 6 each receive the histogram data of brightness of nine blocks of partial images, namely one partial image block of interest and eight adjoining partial image blocks, from the histogram memory 18 via the associated branching terminals 30a–30c. The input histogram data is sent via an input buffer 42 to an operation unit 43. Based on the histogram data of brightness of the nine blocks of partial images, the operation unit 43 computes the product of the frequency data for each brightness and weight data for this frequency, stored in a weight memory 44, and then computes the sum of the obtained products for the individual brightnesses. The computation result is stored in a register 45.

Then, a value stored in a threshold memory 46 is subtracted from the value stored in the register 45 and the result is stored again in the register 45. As a result, the register 45 will hold the result of the computation of the part in the parentheses in the equation (1), which is given below.

$$\sum_{i=1}^{m} Wixi - \theta \quad (3)$$

The value of the Sigmoid function for the value stored in the register 45 is obtained from the function table 41, and is output through an output buffer 47 as the output of the associated one of the intermediate neuron units 31a–31c. The output neuron unit 32 reads out the outputs of the intermediate neuron units 31a–31c one by one in order.

First, the output of the intermediate neuron unit 31a in FIG. 12 is read and is input to the output neuron unit 32. The input of this output neuron unit 32 is supplied to the operation unit 43 via the input buffer 42 shown in FIG. 13. The operation unit 43 computes the product of the output value of the intermediate neuron unit 31a and the first value in the weight memory 44. The computation result is stored in the register 45.

Likewise, the output of the intermediate neuron unit 31b is read next and is input to the operation unit 43 of the output neuron unit 32 via the input buffer 42. The operation unit 43 computes the product of the output value of the intermediate neuron unit 31b and the second value in the weight memory 44. The computation result is added to the value held in the register 45.

The above processing is repeated for all the intermediate neuron units. After the processing for the outputs of all the intermediate neuron units is complete, the value stored in the threshold memory 46 is subtracted from the value held in the register 45. Accordingly, the register 45 will hold the result of the computation given by the equation (1).

The value of this computation result is output via the output buffer 47 as the output value of the neural network 6. The output of the neural network 6 is input to the binarizer 7.

The entire or part of the pixels of the partial image block of interest among the character image stored in the frame memory 3 are sequentially read out and are input to the binarizer 7.

When the brightness of each pixel is larger than the output value of the neural network 6, the pixel is judged as a white pixel, and a white pixel with a given brightness is stored at the pixel position in the frame memory 8 which corresponds to the pixel position in the frame memory 3.

When the brightness of a pixel read from the frame memory 3 is smaller than the output value of the neural network 6, the pixel is judged as a black pixel, and a black pixel with a given brightness is stored at the pixel position in the frame memory 8 which corresponds to the pixel position in the frame memory 3.

When binarization of a predetermined number of pixels of a single partial image block of interest is complete, the entire memory area of the histogram memory 18 is initialized to "0," and the histogram data of the next partial image block of interest and the eight adjoining partial image blocks are input to the neural network 6 to acquire a threshold value. Based on this threshold value, binarization of the new partial image of interest will be performed.

In binarizing part of the pixels of the partial image block of interest, the old partial image block of interest will partially overlap the new partial image block of interest each other.

The above processing is repeated for the entire blocks of the image in the frame memory 3, and the whole image will be binarized and will be stored in this form in the frame memory 8.

The weights and threshold values for the individual neuron units 31a–31c and 32 of the neural network 6 are obtained by the generalized delta rules established by D. E. Rumelhart et al. (the PDP Research Graoup (Eds.) "Parallel Distributed processing" Vol. 1 (MIT Press, 1988).

First, one of more than one sample image is sensed by the image sensor 1, and a plurality of partial sample images are obtained for each sample image. For each partial sample image, the histogram data of brightness of one partial image of interest and the eight adjoining partial images are obtained by the histogram unit 17 and the histogram memory 18 and are stored in the learning data memory 27 as has been described earlier. Also, the optimum threshold value for that partial sample image is stored in the teaching data memory 33.

In other words, the histogram data of brightness of one partial image of interest and the eight adjoining partial images are stored in the learning data memory 27, and the threshold value for binarization corresponding to the learning data stored in the learning data memory 27 is stored as teaching data in the teaching data memory 33.

According to the generalized delta rules, the weights and threshold values for the individual neuron units 31a–31c and 32 are changed in such a way as to reduce the value of "E" in the following equation (4), based on the learning data stored in the learning data memory 27 and the teaching data stored in the teaching data memory 33:

$$E = \frac{1}{2} \sum_{p=1}^{m} (yp - dp)^2 \quad (4)$$

where yp is the output of the neural network when a learning data vector xp is input. The learning data vector is a vector having the frequency for each brightness in the histogram as an element. In the equation (7), dp is the teaching data corresponding to the learning vector xp, and m is the number of pieces of the learning data.

The amount of renewal of each weight Δ is obtained by the steepest descent method from the following equation (8).

$$\Delta W = -\epsilon \frac{\partial E}{\partial W} \quad (\epsilon > 0) \quad (5)$$

The amount of renewal of the weight for the i-th input of the output neuron unit, Δi, is given by $$Wi = -\epsilon \sum_{p=1}^{m} (yp - dp) \cdot yip \quad (6)$$

The amount of renewal of the weight for the j-th input of the intermediate neuron unit i, Δij, is given by $$\Delta Wij = -\epsilon \sum_{p=1}^{m} (yp - dp) \cdot Wi \cdot (1 - yip) \cdot yip \cdot xhp \quad (7)$$

In those two equations, yip is the output of the intermediate neuron unit i for the learning data vector xp, Wi is the weight for the i-th input of the output neuron unit, and xhp is the h-th element of the learning vector xp. As the threshold value for each neuron unit is considered as the weight of the terminal through which "−1" is always input to that neuron unit, the amount of renewal of the threshold value of the output neuron unit is obtained from the equation (6) and the amount of renewal of the threshold value of each intermediate neuron unit is obtained from the equation (7).

In the learning process, the weight parameters of all the neuron units are initialized by random numbers first, and the equations (6) and (7) are repetitively performed by the learning unit 28. When E in the equation (4) become sufficiently small, the processing is terminated and the acquired weight is stored in the weight memory 44 and threshold memory 46 in each of the neuron units 31a–31c and 32 of the neural network 6.

According to the image binarizing apparatus of this embodiment and the third embodiment, as described above, an input image is separated into nine partial image blocks, one partial image block of interest and eight adjoining partial image blocks, and the histogram of brightness for each partial image is input to the neural network to determine the threshold value for binarization. It is therefore possible to perform binarization of an input image which suffer severe uneven illumination.

A description will now be given of an image binarizing apparatus according to the seventh embodiment of this invention, whose structure is illustrated in FIG. 14. Like or same reference numerals as used for the components of the sixth embodiment will be given to corresponding or identical components of the seventh embodiment to avoid repeating their detailed description.

The seventh embodiment differs from the sixth embodiment in the provision of the maximum/minimum detector 19 and the peak detector 20.

The maximum/minimum detector 19 acquires the highest brightness and lowest brightness from the histogram of brightness stored in the histogram memory 18. The peak detector 20 obtains the most frequent brightness, and the ratio of the maximum frequency to the number of pixels of the partial image from the histogram of brightness stored in the histogram memory 18.

Those maximum/minimum detector 19 and peak detector 20 provide the highest brightness, lowest brightness, most frequent brightness and maximum frequency from the histograms of brightness for nine partial image blocks (one partial image block of interest and eight adjoining partial image blocks) segmented from the input image.

The neural network 6 acquires a threshold value using those values, and image binarization is performed based on this threshold value in the same manner as done in the sixth embodiment.

The seventh embodiment can provide a good binarized image even if the input image suffers uneven illumination as in the sixth embodiment, and can significantly reduce the input order of the neural network compared with the sixth embodiment. Accordingly, the seventh embodiment can reduce the scale of the neural network and improve the learning speed.

FIG. 15A, B presents explanatory diagrams for comparing the binarization by this embodiment with the binarization done by the conventional discriminant analysis. FIG. 15A shows an input image which suffers uneven illumination, FIG. 15B shows a binarized image according to this embodiment, and FIG. 15C shows a binarized image acquired by the automatic threshold value selecting method invented by Ohtsu.

It is apparent from those FIGS. 15A, 15B and 15C that even if binarization is executed using just four parameters, namely the highest brightness, lowest brightness, most frequent brightness and maximum frequency, from the histogram of each block as in this embodiment, it is possible to obtain a good binarized image of even an input image that suffers severe uneven illumination, which is difficult by the automatic threshold value selecting method invented by Ohtsu.

A description will now be given of an image binarizing apparatus according to the eighth embodiment of this invention, whose structure is illustrated in FIG. 16. Like or same reference numerals as used for the components of the seventh embodiment will be given to corresponding or identical components of the eighth embodiment to avoid repeating their detailed description.

The eighth embodiment differs from the seventh embodiment in the histogram data of one partial image block of interest and the histogram data of the adjoining eight partial image blocks are output separately from the histogram memory 18, and the former histogram data is directly input to the neural network 6 while the latter histogram data are input via the maximum/minimum detector 19 and peak detector 20 to the neural network 6 as in the seventh embodiment to thereby obtain the highest brightness, lowest brightness, most frequent brightness and maximum frequency.

The eighth embodiment could also provide a good binarized image even if the input image suffers uneven illumination as per the sixth and seventh embodiments.

A description will now be given of an image binarizing apparatus according to the ninth embodiment of this invention, whose structure is illustrated in FIG. 17. Like or same reference numerals as used for the components of the sixth embodiment will be given to corresponding or identical components of the ninth embodiment to avoid repeating their detailed description.

The ninth embodiment differs from the sixth embodiment in the provision of a selector 48 and two operation units 49 and 50.

The selector 48 selects the proper one of the two operation units 49 and 50, which compute a threshold value, based on the output of the neural network 6.

When the neural network 6 determines that "a partial image contains only the background pixels," the operation unit 49 outputs a value smaller than the lowest brightness of that partial image or a value larger than the highest brightness as a threshold value.

When the neural network 6 determines that "a partial image contains pixels other than the background pixels," the operation unit 50 outputs a value computed by a statistical method (such as the Otsu method described herein in the "Background of the Invention" as the "first prior art"), as a threshold value.

As the threshold value for binarization is determined by a statistical method if the partial image block of interest contains a character portion in this embodiment, the influence of the fuzziness of the output value of the neural network can be reduced.

Based on the threshold value acquired by the selected operation unit, image binarization will be executed in the same manner as done in the sixth embodiment.

The ninth embodiment could also provide a good binarized image even if the input image suffers uneven illumination as per the sixth embodiment.

Figure 18:
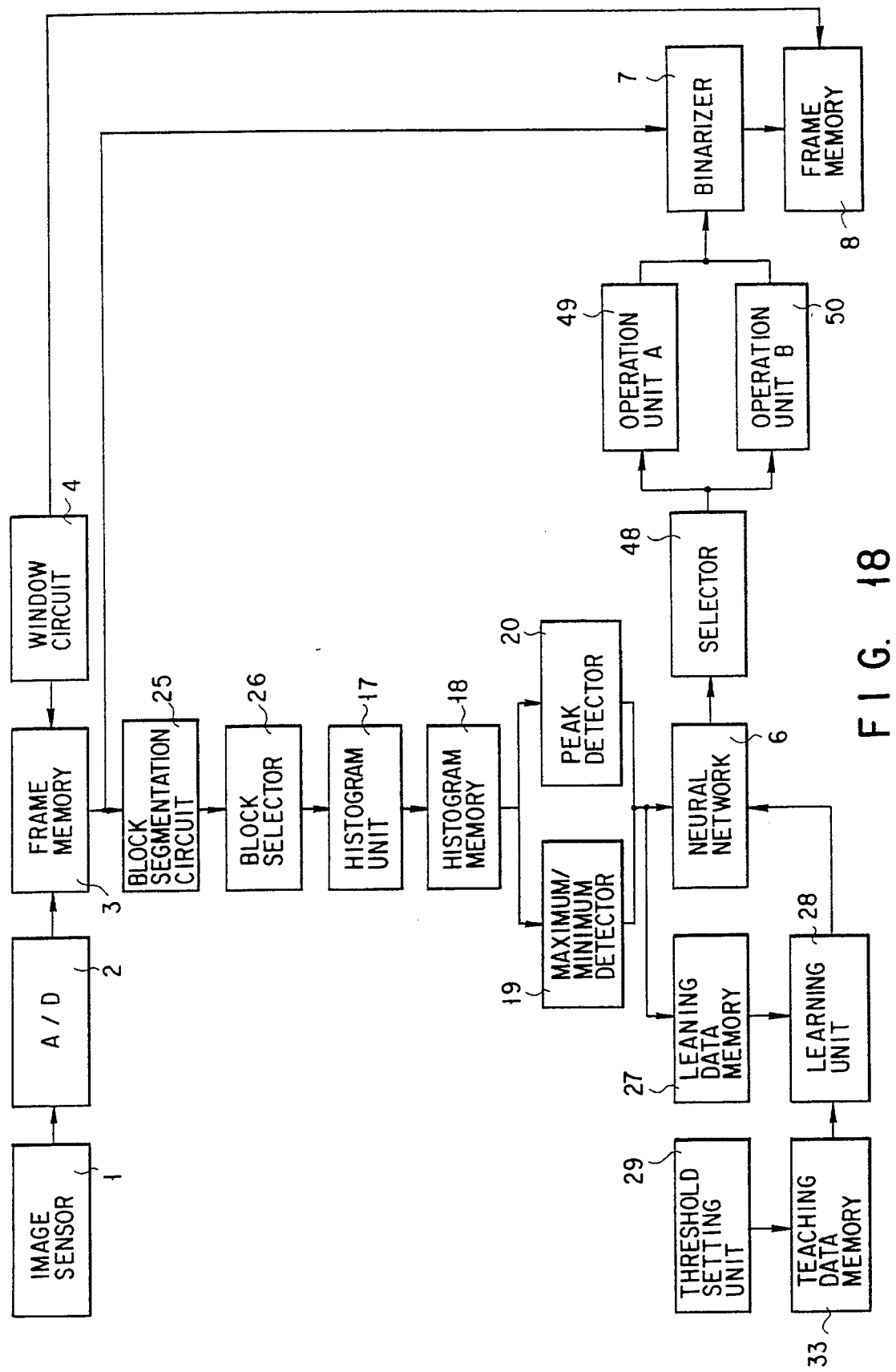
FIG. 18 is a diagram illustrating the structure of an image binarizing apparatus according to a tenth embodiment of this invention.

A description will now be given of an image binarizing apparatus according to the tenth embodiment of this invention, whose structure is illustrated in FIG. 18. Like or same reference numerals as used for the components of the seventh embodiment will be given to corresponding or identical components of the tenth embodiment to avoid repeating their detailed description.

The tenth embodiment differs from the seventh embodiment in the provision of the selector 48 and two operation units 49 and 50.

The tenth embodiment could also provide a good binarized image even if the input image suffers uneven illumination as per the ninth embodiment.

As described in detail above, this invention can provide an image binarizing apparatus that allows the neural network, which has learned using the histogram data of brightness of a partial image block of interest in the input image and a plurality of partial image blocks adjacent to this partial image block of interest, to determine the proper threshold value based on the histogram even if the input image suffers uneven illumination, and that can binarize the input image well and quickly using this threshold value.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image binarizing apparatus comprising:

photoelectric converting means for photoelectrically converting an image into an electric image signal;

image signal separating means for separating an image signal acquired from said photoelectric converting means into a predetermined number of portions to yield partial images;

extracting means for extracting no more than three levels of brightness of a highest brightness, a lowest brightness and an average brightness as parameters from said partial images for a partial image block of interest and for each of a plurality of partial image blocks adjacent to said partial image block of interest;

threshold value computing means for inputting said extracted parameters comprised of no more than said three levels of brightness which are extracted from said partial image block of interest and all of said adjacent partial image blocks to a neural network, and causing said neural network to compute a single threshold value based on only said extracted parameters corresponding to said no more than three levels of brightness; and binarizing means for selectively binarizing a plurality of pixels which form part of all of the pixels constituting an image, based on said threshold value acquired by said threshold value computing means.

2. The image binarizing apparatus according to claim 1, wherein said threshold value computing means includes:

another threshold value computing means for acquiring a temporary threshold value based on at least one type of parameter among said parameters extracted by a second extracting means;

compensation value computing means for inputting said extracted parameters to said neural network, and causing said neural network to compute a compensation value for a threshold value with one processing; and compensating means for compensating said temporary threshold value with said compensation value.

3. The image binarizing apparatus according to claim 2, wherein said neural network learns by using as learning data a highest brightness, a lowest brightness and an average brightness which are extracted from each partial image selected from at least one sample character image, and by using as teaching data an optimum threshold value for the selected partial images or said compensation value for said temporary threshold value.

4. The image binarizing apparatus according to claim 1, wherein said threshold value computing means includes:

another threshold value computing means for acquiring a temporary threshold value based on at least one type of parameter among said parameters extracted by a second extracting means;

compensation value computing means for inputting said extracted parameters to said neural network, and causing said neural network to compute a compensation value for a threshold value with one processing; and compensating means for compensating said temporary threshold value with said compensation value.

5. The image binarizing apparatus according to claim 4, wherein said neural network learns by using as learning data a highest brightness, a lowest brightness and an average brightness which are extracted from each of partial image blocks selected from at least one sample character image, and by using as teaching data an optimum threshold value for the selected partial image blocks or said compensation value for said temporary threshold value.

6. The image binarizing apparatus according to claim 1, wherein said neural network learns by using as learning data a highest brightness, a lowest brightness and an average brightness which are extracted from each of partial image blocks selected from at least one sample character image, and by using as teaching data an optimum threshold value for the selected partial image blocks.

7. An image binarizing apparatus comprising:

photoelectric converting means for photoelectrically converting an image into an electric image signal;

image signal separating means for separating an image signal acquired from said photoelectric converting means into a predetermined number of portions to yield partial images;

block selecting means for selecting a partial image block of interest from yielded partial images;

threshold value computing means for computing a plurality of threshold values for said partial image block of interest selected by said block selecting means;

extracting means for extracting no more than three levels of brightness of a highest brightness, a lowest brightness and an average brightness as parameters from said partial images for said partial image block of interest and for each of said partial image blocks adjacent to said partial image block of interest; and threshold value selecting means for inputting said extracted parameters comprised of no more than said three levels of brightness which are extracted by said extracting means to a neural network, and causing said neural network to select only one of a plurality of threshold values computed by said threshold value computing means based on only said extracted parameters corresponding to said no more than three levels of brightness, and wherein a plurality of pixels which form part of all the pixels constituting an image are selectively binarized on the basis of a selected threshold value.

8. The image binarizing apparatus according to claim 7, wherein:

said threshold value computing means computes for both white and black pixels in accordance with a statistical method a threshold value which is set in a range between a brightness in white pixels and a brightness in black pixels; and said threshold value computing means computes for either white or black pixels a threshold value which is lower than that of a lowest brightness in said partial image block of interest and a threshold value which is higher than that of a highest brightness in said partial image block of interest.

9. The image binarizing apparatus according to claim 8, wherein said neural network learns by using as learning data said no more than three levels of brightness which include a highest brightness, a lowest brightness and an average brightness which are extracted from each of partial image blocks selected from at least sample character image, and by using as teaching data, detected information as to whether the partial image blocks include both white and black pixels, only white pixels, or only black pixels.

10. The image binarizing apparatus according to claim 7, wherein said neural network learns by using as learning data said no more than three levels of brightness which include a highest brightness, a lowest brightness and an average brightness which are extracted from each of partial image blocks selected from at least one sample character image, and by using as teaching data, detected information as to whether the partial image blocks include both white and black pixels, only white pixels, or only black pixels.

* * * * *